(12) United States Patent
Kieltyka

(10) Patent No.: US 7,472,204 B2
(45) Date of Patent: Dec. 30, 2008

(54) ROUTING MULTIPLE MEDIA SIGNALS THROUGH A PATCHBAY

(75) Inventor: John F. Kieltyka, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 11/192,183

(22) Filed: Jul. 29, 2005

(65) Prior Publication Data

US 2007/0028007 A1    Feb. 1, 2007

(51) Int. Cl.
*G06F 3/00* (2006.01)
(52) U.S. Cl. ............... 710/2; 710/8; 710/36; 710/38
(58) Field of Classification Search ............. 710/2
See application file for complete search history.

(56) References Cited

U.S. PATENT DOCUMENTS 3,295,092 A * 12/1966 Newman et al. ............. 439/50
6,532,512 B1 * 3/2003 Torii et al. .................. 710/316
6,564,275 B1 * 5/2003 Chen ........................... 710/107

OTHER PUBLICATIONS

Universal Serial Bus Specification, Apr. 27, 2000, Revision 2.0, pp. 11, 16, 29, 155-156, 297-300.*
Universal Serial Bus Specification, Apr. 27, 2000, Revision 2.0, pp. 11, 16, 29, 155-156, 287-288, 297-300, 316.*

* cited by examiner

*Primary Examiner*—Alford W Kindred
*Assistant Examiner*—Zachary K Huson
(74) *Attorney, Agent, or Firm*—Shook, Hardy & Bacon, L.L.P.

(57) ABSTRACT

A system and method are disclosed for managing a plurality of connected devices from a controlling computer. The method can include connecting a controlling computer to a routing unit wherein the routing unit has connections to a plurality of devices. The method can further include selecting one or more connected devices, the one or more selected devices being fewer in number than the connected devices. Additionally the method can include communicating with the one or more selected devices.

9 Claims, 4 Drawing Sheets

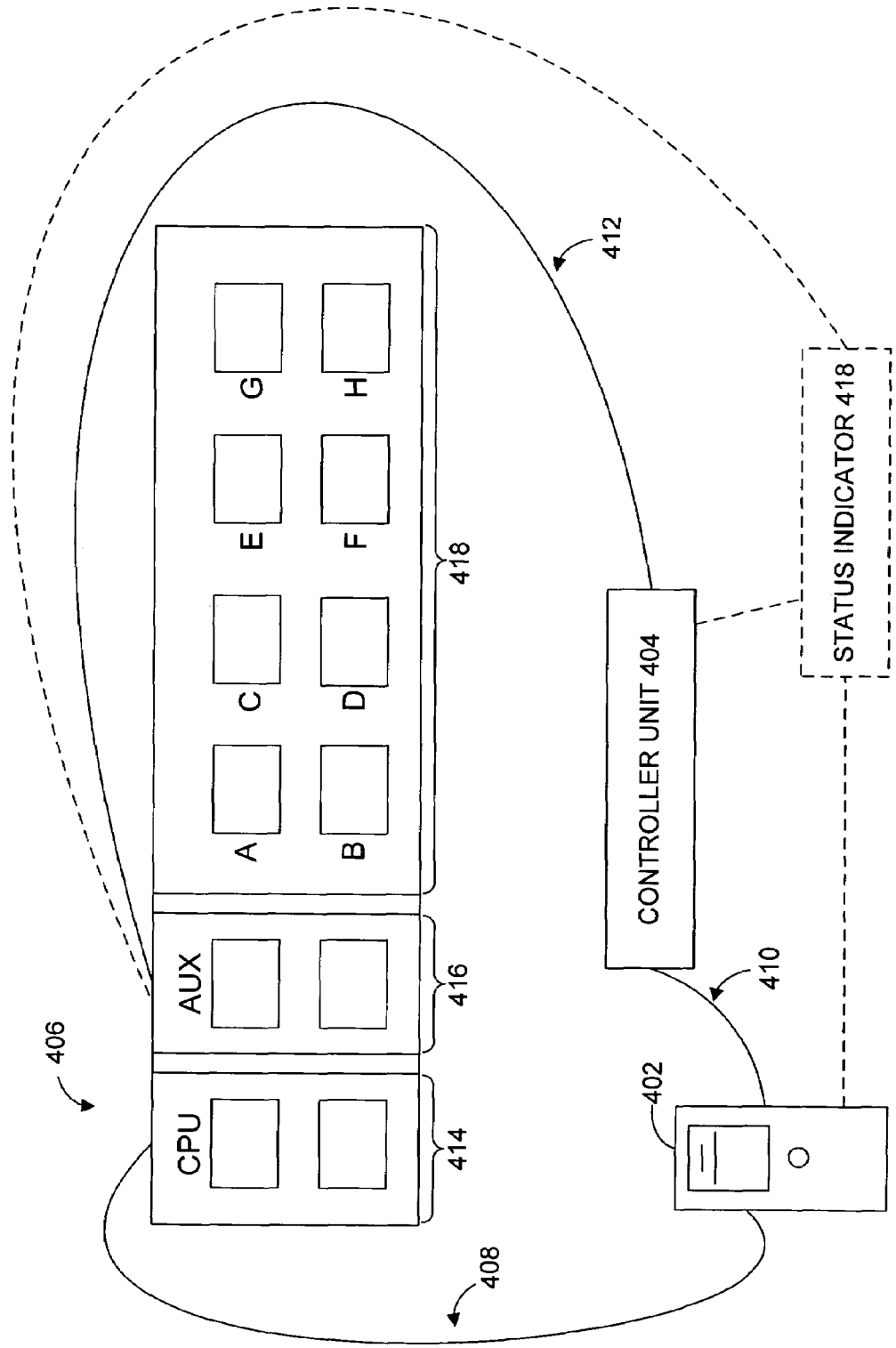

ROUTING MULTIPLE MEDIA SIGNALS THROUGH A PATCHBAY

CROSS-REFERENCE TO RELATED APPLICATION

Not applicable.

STATEMENT REGARDING FEDERALLY SPONSORED RESEARCH OR DEVELOPMENT

Not applicable.

BACKGROUND

It may be desirable for an operating system to be compatible and configured for use with a plurality of third party devices. An operating system that is configured for use with a multitude of third party devices can allow end users to operate third party devices without requiring them to load third party software. To enable this a vast amount of testing may need to be done before a third party device is on the market. More specifically, a software company may need to test a copious amount of third-party devices separately to determine if each third party device is currently compatible with the software company's operating system. Further tests may be needed to determine how to enable a third party device to be compatible with the operating system. For example, if a third party device is not initially compatible with the software company's operating system, additional code may need to be written and tested to enable the third party device to be compatible with the operating system.

It could impose a great burden on a software company to have to test each individual third party device separately as such a task can consume a large amount of time. It may be a benefit to the software company to be able to connect a plurality of third party devices to a testing computer for the purpose of testing the plurality of third party devices without having to connect and disconnect each third party device one at a time. With current technology, an example of a way to connect several devices to a computer is by use of either a USB hub or additional USB ports on a computer. For testing purposes, however, this can be ineffective as all devices attached to a hub or additional ports are recognized by the computer at once. Therefore, it would be desirable to implement a method that would allow multiple third party devices to be connected to and selected by a computer without requiring a user to connect, disconnect or turn off each third party device one at a time. It would also be desirable to implement a method that allows the computer to select only those connected devices that are desired without requiring the computer to select all connected third party devices at once.

SUMMARY

The invention is directed towards a system for managing a plurality of connected devices from a controlling computer. The system can include a plurality of peripheral connection ports and a plurality of connectivity ports. The plurality of connectivity ports can be of an equal number with respect to the plurality of peripheral connection ports, wherein each of the plurality of connectivity ports is in communication with a peripheral connection port of the plurality of peripheral ports.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 illustrates an embodiment of the invention in which a routing unit is connected to a controlling computer in a passive configuration and an active configuration simultaneously.

DETAILED DESCRIPTION

The invention can enable a user to connect multiple devices to a routing unit to be selected by a computer without requiring a user to connect, disconnect or turn off each third party device one at a time, and can allow the computer to select only those connected devices that are desired without requiring the computer to select all connected third party devices at once. The routing unit can be configured to route media signals manually or programmatically. Routing media signals can include manually mapping the media signals between a plurality of devices and a controlling computer, and can also include programmatically transmitting media signals between a plurality of devices and a controlling computer.

Figure 1:
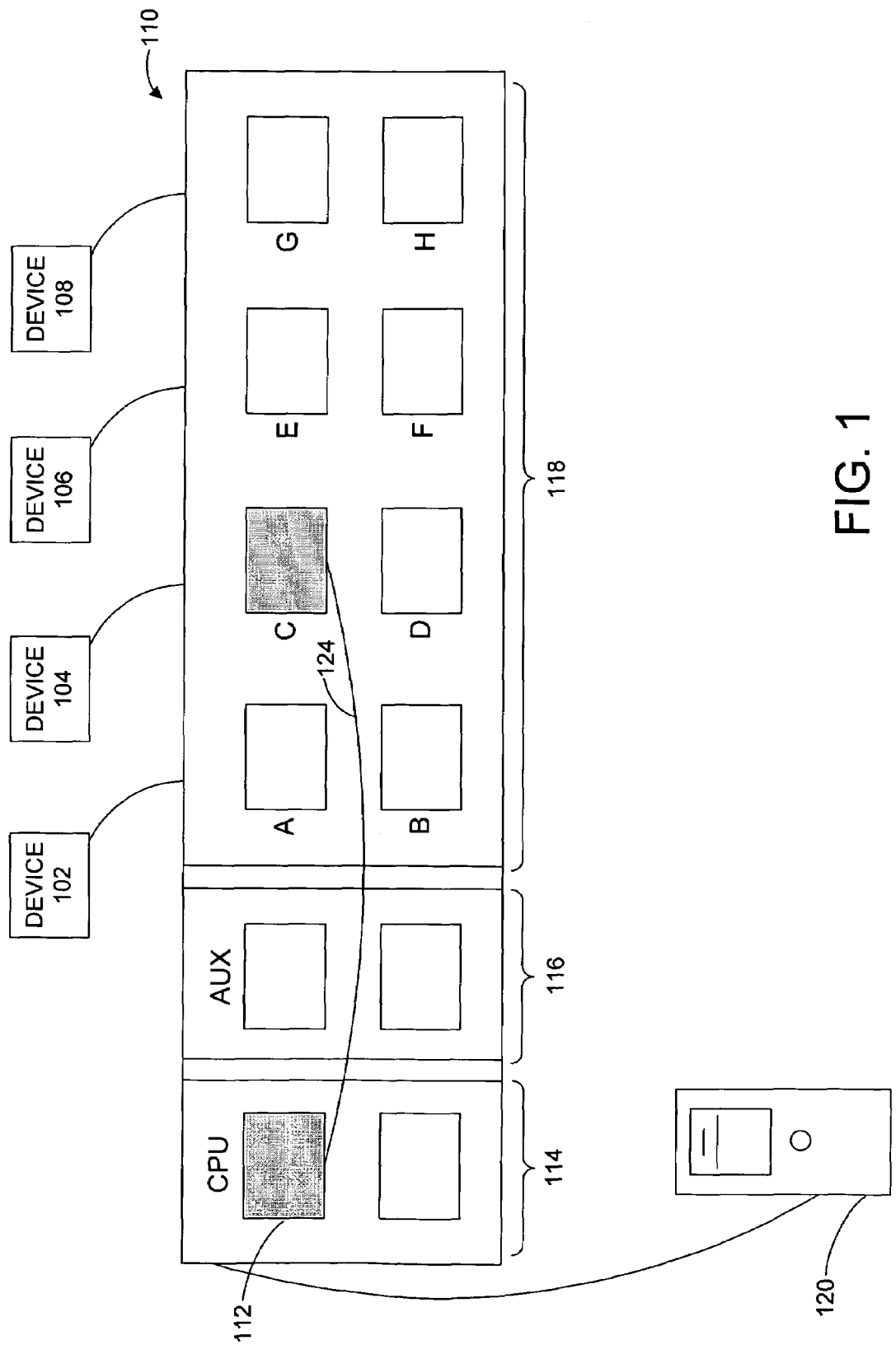
FIG. 1 illustrates an embodiment of a system of the invention in a passive configuration.

FIG. 1 illustrates an embodiment of a system of the invention in a passive configuration. Routing unit 110 can be, for example, a patchbay that can allow a controlling computer 120 to manage one or more devices 102-108 by controlling the devices and obtaining information from the devices. Devices 102-108 can be, for example, scanners, digital cameras, printers, or any other device that can be controlled or interrogated by a computer or that can transmit information to a computer. Controlling computer 120 may be or include a desktop or laptop computer, a network-enabled cellular telephone, wireless email client, or other client, machine or device to perform various tasks including Web browsing, search, electronic mail (email) and other tasks, applications and functions. Controlling computer 120 may also be or can include a server including, for instance, a workstation running Microsoft Windows®, MacOS™, Unix, Linux, Xenix, IBM AIX™, Hewlett-Packard UX™, Novell Netware™, Sun Microsystems Solaris™, OS/2™, BeOS™, Mach, Apache, OpenStep™ or other operating system or platform.

With reference to the routing unit 110 of FIG. 1, it should be understood that the routing unit 110 shown displays an embodiment of a front representation of the routing unit. Connection ports that are shown on the front of the routing unit have corresponding ports on the rear of the routing unit. Routing unit 110 can have a plurality of connectivity ports 118 for connecting devices 102-108 thereto. It should be understood that routing unit 110 can be designed to include any number of connectivity ports 118 to connect to any number of devices. Devices 102-108 can connect to peripheral connection ports at the rear of the routing unit 110 that correspond to the connectivity ports 118. Connectivity ports 118 can be of any type of media/data connection. In an embodiment of the invention, connectivity ports 118 can be Universal Serial Bus (USB) ports. In another embodiment, the connectivity ports 118 can be FireWire ports. Routing unit 110 can also include computer ports 114 for a controlling computer to connect to. Routing unit 110 can be designed to include any number of computer ports 114 to connect to any number of controlling computers 120. Controlling computer 120 can connect to computer ports at the rear of the routing unit 110 that correspond to computer ports 114. Computer ports 114 can be of any type of media/data connection. In an embodiment of the invention, computer ports 114 can be USB ports. In another embodiment, the computer ports 114 can be FireWire ports. Auxiliary ports 116 can be utilized to connect a plurality of routing units to one another. Auxiliary ports 116 can also be utilized to connect a controller unit to the routing unit 110. Routing unit 110 can be designed to include any number of auxiliary ports 116 to connect any number of other routing units and controller units to routing unit 110. Auxiliary ports can be of any type of media/data connection. In embodiments of the invention, auxiliary ports can include USB ports, FireWire ports, Peripheral Component Interconnect (PCI) card ports, null-modem cable ports, and Ethernet ports.

FIG. 1 also illustrates an example of how the controlling computer 120 can manage a device by controlling a device, transmitting data to a device, or receiving data from a device. As previously stated, FIG. 1 illustrates an embodiment of the invention where the system is in a passive configuration. A passive configuration refers to a mode in which a user can manually map media signals between a device and a controlling computer. As shown in FIG. 1, controlling computer 120 is currently connected to device 104 at port C. In an embodiment, the controlling computer 120 can connect to routing unit 110 through a computer port located at the rear of the routing unit. The computer port that the controlling computer connects to at the rear of the routing unit 110 corresponds to a computer port 112 located at the front of the routing unit 110. A connection cable 124 can be utilized to connect computer port 112 to connectivity port C. The type of connection cable used in this instance can depend on the type of connection port. As mentioned previously, computer ports and connectivity ports can include, for example, USB ports or FireWire ports. In another embodiment, the controlling computer 120 can connect to directly to a connectivity port 118 without the use of a computer port 114. Routing unit 110 can include a peripheral connection port on the rear of the routing unit that can correspond to connectivity port C. Device 104 is currently connected to port C through the peripheral connection port at the rear of the routing unit 110 that corresponds to connectivity port C. Once a connection cable 124 is utilized to connect computer port 112 to connectivity port C, controlling computer 120 can manage device 104 by either controlling device 104, transmitting data to the device 104, or receiving data from the device 104.

In an embodiment, a user can manually map media signals between the controlling computer and different devices by physically connecting a connection cable 124 to each different connectivity port that a device is connected to. For example, devices 102-104 are each connected at the rear of the routing unit 110 through peripheral connection ports that correspond to connectivity ports A, C, E, and G respectively on the front of the routing unit 110. More specifically, device 102 is connected to a peripheral connection port on the rear of routing unit 110 that corresponds to connectivity port A, device 104 is connected to a peripheral connection port on the rear of routing unit 110 that corresponds to connectivity port C, device 106 is connected to a peripheral connection port on the rear of routing unit 110 that corresponds to connectivity port E, and device 108 is connected to a peripheral connection port on the rear of routing unit 110 that corresponds to connectivity port G. A user can manually map media signals between each device and the controlling computer 120 by physically connecting the connection cable 124 from computer port 112 to each desired connectivity port. For example, if a user wanted to connect the controlling computer 120 to device 102 the user can manually map the connection cable 124 from computer port 112 to connectivity port A. If a user wanted to connect the controlling computer 120 to device 108 the user can manually map the connection cable 124 from computer port 112 to connectivity port G. In another embodiment, a user can manually map media signals between a controlling computer and different devices without using computer port 114. For example, a user can manually map between different devices by utilizing a connection cable that goes directly from the controlling computer 120 to a connectivity port 118.

Through use of routing unit 110, a user can pre-connect all devices to the rear of the routing unit for communication to the controlling computer 120 without requiring the user to connect and then disconnect each device separately to and from the controlling computer. Once all devices are connected to the routing unit 110, through use of connection cable 124, the routing unit can allow the controlling computer to select a device without requiring the controlling computer to select all of the connected devices. The routing unit can also allow the controlling computer to select a device from all connected devices without requiring any connected device to be disengaged. Disengaging a device can include shutting-down, turning off, or disconnecting a device.

Figure 2:
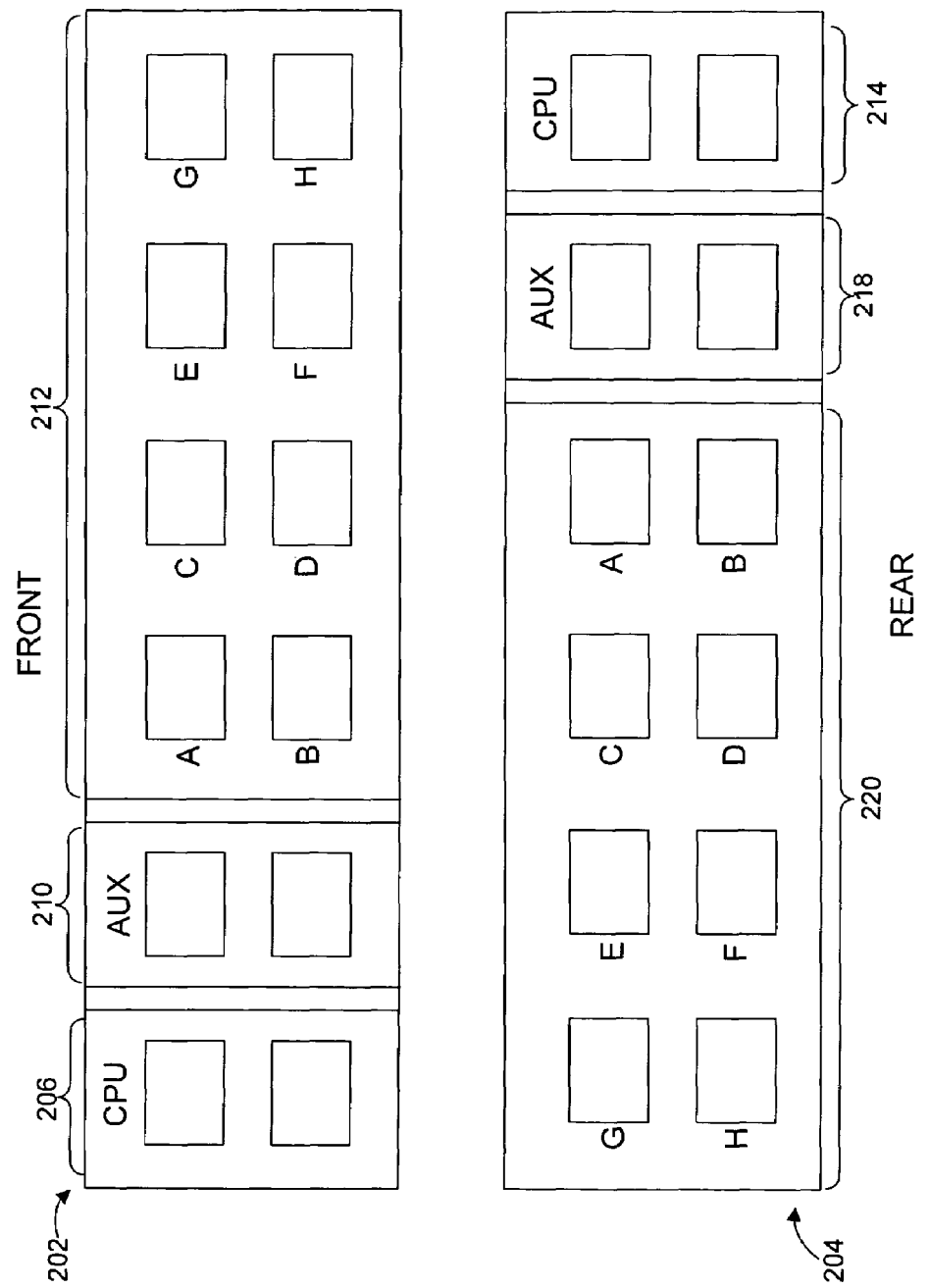
FIG. 2 illustrates an embodiment of a front and a rear view of a routing unit.

FIG. 2 illustrates an embodiment of a front 202 and a rear 204 view of a routing unit. The front 202 portion of the routing unit is similar to the front portion of routing unit 110 as shown in FIG. 1. The front 202 portion can include computer ports 206, auxiliary ports 210, and connectivity ports 212. The rear 204 portion of the routing unit can include corresponding ports to the front of the routing unit. More specifically, peripheral connection ports 220 on the rear of the routing unit correspond to connectivity ports 212 on the front. In an embodiment, a peripheral connection port on the rear can be connected to a connectivity port on the front in a normalled configuration. In a normalled configuration, a peripheral connection port on the rear of the routing unit can correspond to any connectivity port on the front of the routing unit. In another embodiment, a peripheral connection port can connect to a connectivity port on the front in a de-normalled configuration. In a de-normalled configuration, a peripheral connection port on the rear of the routing unit corresponds to the connectivity port directly in front of it. For example, each lettered port on the rear of the routing unit corresponds to the same lettered port on the front of the routing unit. Auxiliary ports 218 and computer ports 214 on the rear of the routing unit can correspond to auxiliary ports 210 and computer ports 206 respectively on the front of the routing unit. In an embodiment, each port on the front of the routing unit can be hard-wired to the corresponding port on the rear of the routing unit. Thus, a controlling computer can connect to a device when a connection cable is inserted from a computer port to a connectivity port on the front of the routing cable and the device is connected to the corresponding peripheral connection port on the rear of the routing unit.

Figure 3:
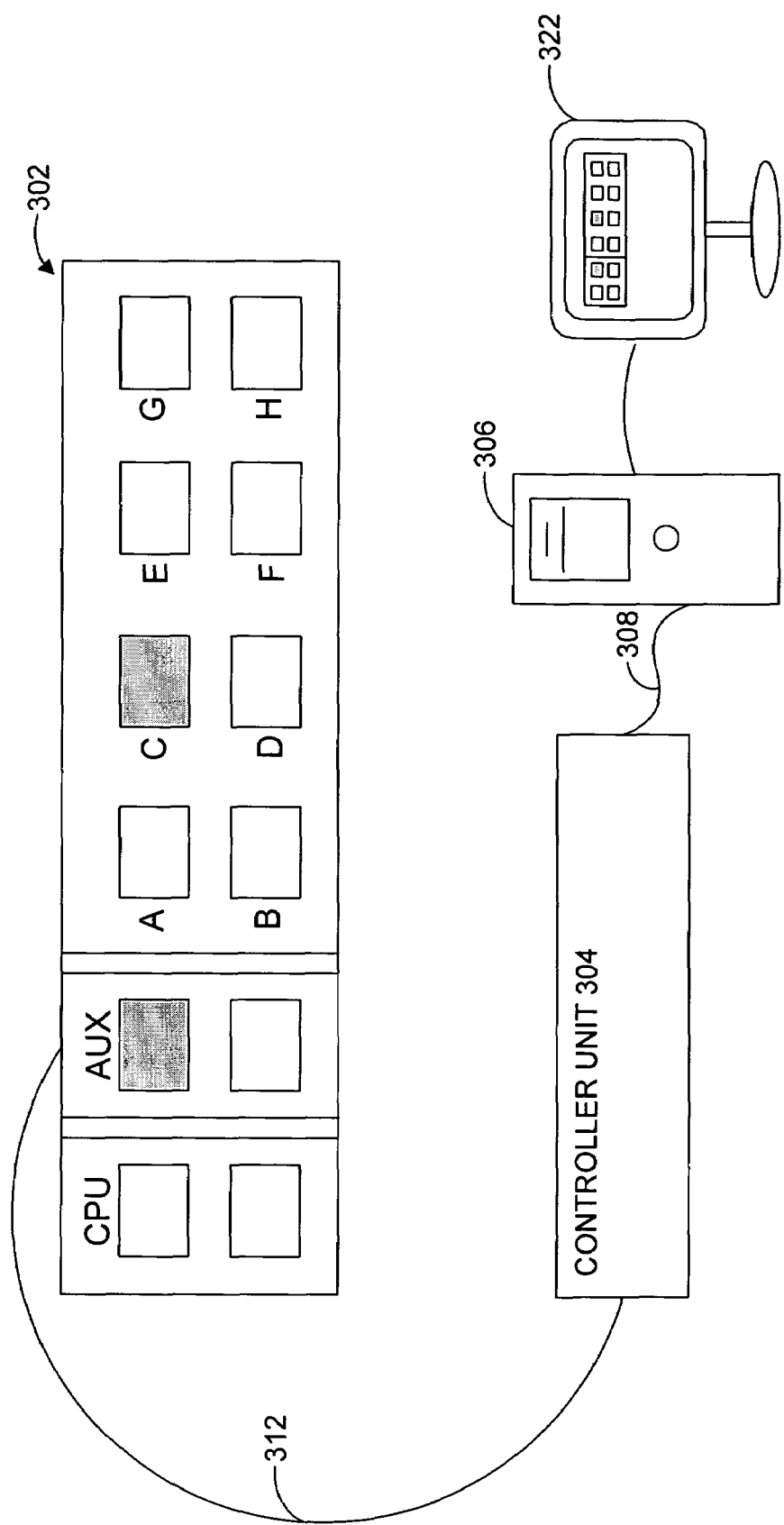
FIG. 3 illustrates an embodiment of an active configuration of the invention.

FIG. 3 illustrates an embodiment of an active configuration of the invention. An active configuration can refer to an embodiment in which a user can programmatically transmit media signals between a controlling computer and a device. Transmitting media signals between a controlling computer and a device can be accomplished with a routing unit 302 in combination with a controller unit 304. The controller unit can be utilized to facilitate communication between the controlling computer 306 and the routing unit 302. The controlling computer can have software that can allow a user to control the routing unit with Graphical User Interface (GUI) applications and command line scripts. The controlling computer 306 can connect to the controller unit 304 through a data connection cable 308 that can include, for example, a Ethernet or a null-modem cable. The controller unit can in turn connect to the routing unit 302 by inputting a data connection cable 312 into an auxiliary port at the rear of the routing unit. The controller unit 304 can include all circuitry necessary to represent and map connections on the routing unit 302, and the controller unit 304 can include all circuitry that can allow the controlling computer to select which connectivity port to activate. The controller unit can contain one or more circuit boards that can work in conjunction with the software stored on the controlling computer to activate any desired port on the routing device. Connectivity ports A-H can be connected to auxiliary ports through a system bus that can allow a controlling computer to activate or deactivate a desired port. Through utilization of software stored on the controlling computer and the controller unit, the activation of desired ports can be automated and programmed. The software can enable a controlling computer to automatically map and activate each device or a selected device connected to a peripheral connection port on the rear of routing unit 302 without requiring any user interaction. While in an active configuration, the controlling computer can select and activate more than one connectivity/peripheral connection port simultaneously if desired. A controlling computer can select and activate more than one connectivity/peripheral connection port simultaneously while in a passive configuration, however, this may require the controlling computer to include more than one computer input/output connection to connect from the controlling computer to the computer ports 114 (FIG. 1). The controller unit 304 can be an external controller interface as shown in FIG. 3, or in other embodiments, the controller unit 304 can be integrated within either the controlling computer 306 or the routing unit 302. For example, the controller unit can be a PCI controller card that can be integrated within the controlling computer 306 or the routing unit 302. In an active configuration, a visual representation of which device the controlling computer is currently managing can be displayed on monitor 322. Such a visual representation can include a graphical or a textual representation. For example, as shown in FIG. 3, controlling computer 306 is currently managing a device connected to connectivity port C. A visual representation showing the controlling computer managing the device connected to connectivity port C is shown on monitor 322.

FIG. 4 illustrates an embodiment of the invention that displays a routing unit connected to a controlling computer in a passive configuration and in a active configuration simultaneously. A controlling computer 402 can establish a passive configuration by connecting to a routing unit 406 with a connection cable 408 being inputted into a computer port 414. The controlling computer 402 can then establish a active configuration by connecting to the controller unit 404 with a connection cable 410 that can be inputted into a controller unit 404 and a connection cable 412 inputted into an auxiliary port 416 of the routing unit 406. A user can then choose to map media signals between the controlling computer and a device through the routing unit 406 either manually, or alternatively, the user can choose to transmit media signals through the routing unit programmatically. If a user is currently transmitting media signals programmatically and then wishes to manually map media signals, it can be possible, using software stored on the controlling computer 402, to disable the active configuration by quitting an application that executes the transmission of media signals programmatically. Once the application is disabled, the user can proceed to manually map media signals between the controlling computer 402 and a device. If a user is currently mapping media signals between a controlling computer and a device manually, using software stored on the controlling computer, the user can choose to enable the active configuration by executing an application that begins a process of programmatically transmitting media signals between the controlling computer and a device.

In another embodiment of the invention, a status indicator 418 can be utilized to display which device ports with connected devices are currently in use or activated by the controlling computer 402. For example, the status indicator 418 can include a series of light-emitting diodes (LEDs) that can correspond to each connectivity port capable of being connected to by a device. If a connectivity port is in use the corresponding LED can be on, and if a connectivity port is not in use the corresponding LED can be off. The status indicator 418 can be a separate external component, or in other embodiments, the status indicator can be integrated within either the controlling computer 402, the controller unit 404, or the routing unit 406.

In an embodiment the invention can include a system for managing a plurality of connected devices from a controlling computer. The system can include a routing unit for manually mapping media signals between a plurality of devices and a controlling computer. The routing unit can allow the controlling computer to select a device of the plurality of devices without requiring the controlling computer to select all of the plurality of devices. Moreover, the system can include a plurality of Input/Output (I/O) ports coupled to the routing unit for connecting the plurality of devices and the controlling computer to the routing unit. The system can allow the controlling computer to select the device without requiring any other device from the plurality of devices connected to the routing unit to be disengaged.

In further embodiments the invention can include a system for managing a plurality of connected devices from a controlling computer that can further include a routing unit to programmatically transmit media signals between a plurality of devices and a controlling computer. The routing unit can allow the controlling computer to select a device of the plurality of devices without requiring the controlling computer to select all of the plurality of devices. Moreover, the system can include a plurality of Input/Output (I/O) ports coupled to the routing unit for connecting the plurality of devices and the controlling computer to the routing unit. The system can additionally include a controller unit coupled to the routing unit for facilitating communication between the routing unit and the controlling computer. The system can allow the controlling computer to select the device without requiring any other device from the plurality of devices connected to the routing unit to be disengaged.

In alternative embodiments the invention can include a system for managing a plurality of connected devices from a controlling computer that can further include a routing unit that can manually map and programmatically transmit media signals between a plurality of devices and a controlling computer. The routing unit can allow the controlling computer to select a device of the plurality of devices without requiring the controlling computer to select all of the plurality of devices. Moreover, the system can include a plurality of Input/Output (I/O) ports coupled to the routing unit for connecting the plurality of devices and the controlling computer to the routing unit. The system can additionally include a controller unit coupled to the routing unit for facilitating communication between the routing unit and the controlling computer. The system can allow the controlling computer to select the device without requiring any other device from the plurality of devices connected to the routing unit to be disengaged.

In an embodiment the invention can include a method for managing a plurality of connected devices from a controlling computer. The method can include receiving a plurality of connections from a plurality of devices and a controlling computer. Additionally, the method can include routing media signals between the plurality of devices and the controlling computer. Moreover, the method can include selecting one or more device of the plurality of devices without a requirement to select all of the plurality of devices and without requiring any of the plurality of devices to be disengaged. The method can also include communicating with the one or more selected devices.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

I claim:

1. A system for managing a plurality of connected devices from one or more controlling computers, comprising:
   a routing unit for transmitting media signals between a plurality of devices and one or more controlling computers, wherein the routing unit allows a first controlling computer to select at least one device without requiring the first controlling computer to select all of the devices, and further wherein the routing unit allows a user to manually map connections between the one or more controlling computers and one or more of the plurality of devices;
   a controller unit coupled to the routing and the first controlling computer for allowing the first controlling computer to map a connection between the first controlling computer and the at least one device, wherein the controller unit is coupled to the routing unit via a connection cable connected to a first auxiliary connection port coupled to the routing unit, the first auxiliary connection port comprising a media/data connection port that is associated with a second auxiliary connection port coupled to the routing unit;
   first and second computer connection ports coupled to the routing unit, the first computer connection port comprising a media/data connection port for connecting a second controlling computer to the routing unit via a connection cable, wherein the first computer connection port is associated with the second computer connection port;
   a plurality of peripheral connection ports coupled to the routing unit, wherein each of the plurality of peripheral connection ports comprises a media/data connection port for connecting the routing unit to a device via a connection cable;
   a plurality of connectivity ports equal in number to the plurality of peripheral connection ports, wherein each of the plurality of connectivity ports is associated with a peripheral connection port and comprises a media/data connection port for connecting the peripheral connection port via a connection cable to at least one of the second auxiliary connection port and the second computer port, such that the device connected to the peripheral connection port can be disconnected from at least one of the first and second controlling computers by removing the connection cable between the connectivity port and the at least one of the second auxiliary connection port and the second computer port while maintaining the connection between the device and the routing unit; and
   a system bus for connecting the first auxiliary connection port to the plurality of connectivity ports.

2. The system according to claim 1, wherein the routing unit is configured to allow the first controlling computer to select more than one device of the plurality of devices simultaneously.

3. The system according to claim 1, wherein the plurality of peripheral connection ports and connectivity ports are Universal Serial Bus ports.

4. The system according to claim 1, further comprising software stored on at least one of the first controlling computer and the controller unit to enable automated and programmed transmission of media signals between the plurality of devices and the first controlling computer, wherein the software comprises at least one program that directs the first controlling computer to select and activate at least one of the plurality of devices.

5. The system according to claim 1, wherein the first controlling computer selects the one or more device without requiring any other device from the plurality of devices connected to the routing unit to be disengaged.

6. The system according to claim 1, further comprising a status indicator, wherein the status indicator displays a representation of the peripheral connection and connectivity ports that are selected by the first controlling computer.

7. A system for managing a plurality of connected devices from one or more controlling computers, comprising:
   a plurality of peripheral connection ports coupled to a routing unit for connecting the plurality of devices to the routing unit, wherein each of the plurality of peripheral connection ports comprises a media/data connection port for transmitting communication signals between the routing unit and at least one of the plurality of devices via a connection cable;
   a plurality of connectivity ports coupled to the routing unit for connecting the one or more controlling computers to one or more of the plurality of peripheral connection ports, the plurality of connectivity ports being equal in number to the plurality of peripheral connection ports, wherein each of the plurality of connectivity ports is connected to at least one of the plurality of peripheral connection ports and comprises a media/data connection port for transmitting communication signals between the one or more controlling computers and the at least one of the plurality of peripheral connection ports such that a device connected to the routing unit via the at least one peripheral connection port can be selectively disconnected from the one or more controlling computers by way of removing the connection cable from a connectivity port associated with the at least one peripheral connection port while maintaining the connection between the device and the routing unit; and a plurality of computer ports coupled to the routing unit, wherein at least one of the plurality of computer ports is connected to at least one other computer port, wherein each of the plurality of computer ports comprises a media/data connection port for transmitting signals between a controlling computer and a connectivity port through a connection cable connected to the at least one other computer port.

8. The system according to claim 7, wherein the plurality of connectivity ports and peripheral ports are Universal Serial Bus ports.

9. The system according to claim 7, further comprising a controlling computer connected to at least one of a connectivity port and a computer port.

* * * * *